United States Patent
Pollard (10) Patent No.: US 7,477,297 B2
(45) Date of Patent: Jan. 13, 2009

(54) COMBINED OPTICAL AND DIGITAL ZOOM

(75) Inventor: Stephen Bernard Pollard, Gloucestershire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 10/805,218

(22) Filed: Mar. 22, 2004

(65) Prior Publication Data

US 2004/0189830 A1 Sep. 30, 2004

(30) Foreign Application Priority Data

Mar. 29, 2003 (GB) ................................. 0307293.1

(51) Int. Cl.
*H04N 5/262* (2006.01)
(52) U.S. Cl. .................. 348/240.1; 348/240.3
(58) Field of Classification Search ............. 348/240.1, 348/240.2, 240.3, 240.99
See application file for complete search history.

(56) References Cited

U.S. PATENT DOCUMENTS

| 5,420,632 A | 5/1995 | Yamagiwa |
| 6,947,074 B2 * | 9/2005 | Koseki et al. ............ 348/240.1 |

FOREIGN PATENT DOCUMENTS

| EP | 1274241 | 1/2003 |
| GB | 2194116 | 2/1988 |

OTHER PUBLICATIONS

010336494, Abstracts of Japan, Ryuichi May 29, 1995.

\* cited by examiner

*Primary Examiner*—Tuan V Ho (57) ABSTRACT

Digital and optical zoom are combined over a number of discrete digital zoom levels. Digital interpolation is provided during transition periods between the discrete digital zoom levels such that the total apparent zoom level appears continuous and uninterrupted.

13 Claims, 7 Drawing Sheets

COMBINED OPTICAL AND DIGITAL ZOOM

RELATED APPLICATIONS

The present application is based on, and claims priority from, GB Application Number 0307293.1, filed Mar. 29, 2003, the disclosure of which is hereby incorporated by reference herein in its entirety.

FIELD OF INVENTION

The present invention relates to digital imaging and more particularly to a digital imaging method and apparatus having combined optical and digital zoom.

BACKGROUND ART

Digital image capture technology is rapidly replacing film based technology. Both digital still and video cameras are now widely available. Also available are photo-video camera products that combine digital still and video capabilities into A single device. Digital still photography requires an image sensor with as high as possible a resolution, for example a 5 Mega-Pixel (MP) sensor in an approximately 2600×2000 pixel format. The high resolution is required to match the image quality of film based photography. Digital video photography, on the other hand, only requires a much lower resolution, typically about VGA resolution of 640×480 pixels at 30 frames per second. Consequently, for photo-video cameras the video images are typically sampled at an appropriate sample rate with respect to the native resolution of the sensor. That is to say that although an image is formed using the entire sensor resolution of 2600×2000 pixels only a reduced number of those pixels is used to form the video image. Typically, the sampling process also involves some element of binning where the electrical charge from a block of pixels is combined before analogue to digital conversion occurs.

This inherent mismatch between still and video resolution offers the opportunity to provide some digital zoom facility. Taking the previous example of a 5MP sensor, there is a possible four fold difference in magnification between VGA resolution images obtained on the one hand by sampling every fourth pixel horizontally and vertically over the whole sensor and on the other hand by sampling a 640×480 pixel region from the centre of the sensor at the sensor's native resolution. Digital zoom is therefore an inherently discrete process, in contrast to the zoom effect provided by an optical zoom lens, which is virtually continuous. It is known to provide digital still and video cameras that offer some form of digital zoom as either an alternative to optical zoom or as a way to increase the overall zoom factor. In these schemes, the digital zoom process produces a cropped image that is generally up-sampled back to the full still/video resolution using some form of pixel interpolation.

Interpolation, sometimes referred to as resampling, is an imaging method for increasing the size of a digital image. Various interpolation schemes are known. For example, the simplest way to increase the size of a digital image is called "nearest neighbour" interpolation. This simply takes the colour of the new pixel's nearest neighbour and uses it for this new pixel. However, this results in visible pixelisation and visible jaggies. A more sophisticated interpolation scheme is bilinear interpolation, which is commonly used in digital cameras. This produces relatively smooth edges with hardly any jaggies. An output pixel is determined as a bilinear function of the four pixels in the nearest 2×2 neighbourhood of the pixel in the source image. Bicubic interpolation is an even more sophisticated scheme and produces very smooth edges with hardly any jaggies. An output pixel is a bicubic function of the 16 pixels in the nearest 4×4 neighbourhood of the pixel in the source image. This is a commonly used interpolation method in photographic editing software. However, all interpolation involves creating image data that has not been actually recorded and the result is therefore always inferior to an actual image captured by a true optical zoom.

As mentioned above, it is known to provide digital still and video cameras that provide both digital and optical zoom facilities. For example, U.S. Pat. No. 5,684,532 describes a video camera system for use with a security surveillance system in which a digital zoom facility is provided to allow rapid changes in image magnification, with an optical zoom facility provided as well. Having switched to the desired magnification factor using the digital zoom facility, the optical zoom lens is operated to match the magnification factor provided by the digital zoom. As the optical zoom magnification factor increases the electronic zoom factor is correspondingly decreased so that the overall magnification factor of the image is substantially unchanged. A similar scheme is also described in the U.S. Pat. No. 5,701,157. In this patent a zoom apparatus is described that uses a digital zoom facility simultaneously with an optical zoom facility to compensate for the non-linear magnification factor of the optical zoom facility. A similar system is also described in U.S. Pat. No. 5,420,632.

SUMMARY OF THE INVENTION

According to an aspect of the present invention zoom apparatus comprises an optical zoom lens arranged to provide an image across a continuous zoom range, an image sensor arranged to receive an image from the optical zoom lens and to provide a digital representation of the image and digital zoom apparatus arranged to apply one of at least two discrete zoom levels to the digital representation of the image such that the total apparent zoom level is the product of the discrete digital zoom level and the optical zoom level. The digital zoom apparatus is arranged to apply digital interpolation to the digital representation of the image during a transition period between discrete zoom levels.

It is therefore possible to provide zoom apparatus that provides a substantially continuous zoom function across the entire zoom range produced as a product of individual optical and digital zoom ranges with a minimum of digital interpolation being required.

Preferably, during the transition period between discrete digital zoom levels the optical zoom lens is adjusted to substantially compensate for the change in discrete digital zoom level.

Additionally, the zoom lens is preferably arranged to be automatically adjusted to a point in the optical zoom lens zoom range that provides, as a product of zoom level with the changed digital zoom level, a total apparent zoom level substantially equal to the zoom level provided by the digital interpolation.

The digital zoom apparatus preferably applies the digital interpolation such that the rate of change of total apparent zoom level is substantially equal to the rate of change of zoom level provided by the optical zoom lens. Consequently, the total apparent zoom range appears to be continuous and unbroken even during a transition of discrete zoom level.

Additionally or alternatively, the transition period between discrete digital zoom levels is preferably initiated only at the end points of the optical zoom lens zoom range.

Additionally or alternatively, the zoom lens is preferably arranged to be automatically adjusted from a first end of the zoom lens zoom range towards a second end of the zoom range during the transition period between discrete zoom levels.

Additionally or alternatively, the discrete digital zoom levels may be provided by applying discrete charge binning schemes.

According to a second aspect of the present invention there is provided a method of operating a zoom apparatus, the method comprising operating an optical zoom lens across a continuous zoom range to provide an optical image, applying one of a plurality of discrete digital zoom levels to a digital representation of the optical image such that the total apparent zoom level is a product of the discrete digital zoom level and the optical zoom level and applying digital interpolation to the digital representation of the image during a transition period in which the level of discrete digital zoom is changed.

Preferably, during the transition period between discrete digital zoom levels the optical zoom lens is adjusted to substantially compensate for the change in discrete digital zoom level.

Additionally, the zoom lens is preferably operated so as to return to a point in the optical zoom range that provides a product of optical zoom level with the change in discrete digital zoom level a total apparent zoom level substantially equal to the zoom level provided by the digital interpolation.

Additionally, the digital interpolation is preferably applied such that the rate of change of total apparent zoom level is substantially equal to the rate of change of zoom level provided by the optical zoom lens.

Additionally or alternatively, the transition period in which the level of discrete digital zoom is changed is preferably initiated only at the end points of the zoom range provided by the optical zoom lens.

Additionally or alternatively, the zoom lens is preferably operated during the transition period so as to return from the end point of the zoom range reached immediately prior to the transition period towards the opposite end point of the zoom range.

Additionally or alternatively, each of the plurality of discrete digital zoom levels is preferably provided by applying a discrete charge binning scheme.

According to a further aspect of the present invention there is provided a digital camera comprising the zoom apparatus of the first embodiment of the invention.

BRIEF DESCRIPTION OF THE DRAWING

An embodiment of the present invention is described hereinafter, by way of illustrative example only, with reference to the accompanying figures, of which.

DETAILED DESCRIPTION OF THE DRAWING

Figure 1:
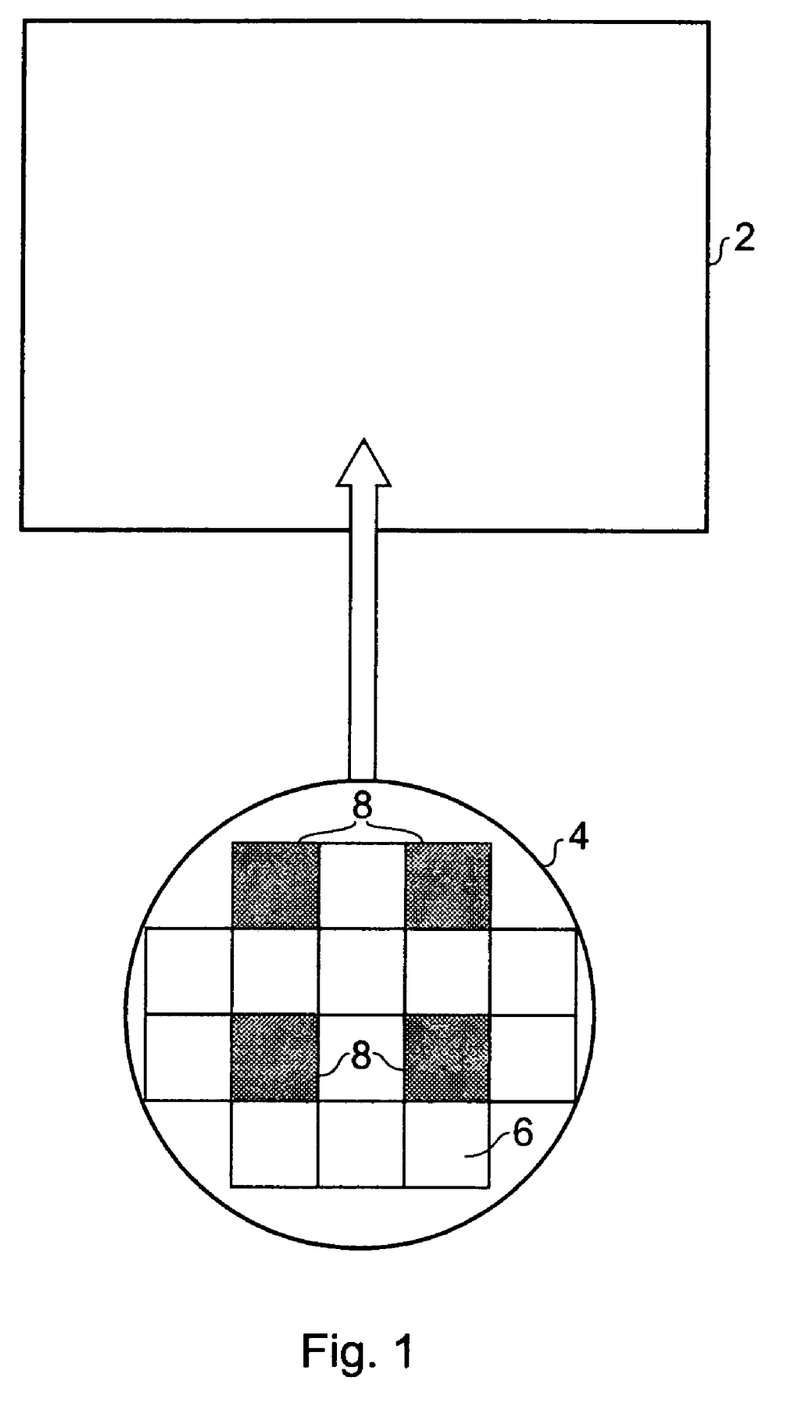
FIG. 1 is a schematic illustration of the sampling of an image sensor at half the possible pixel sites.
Figure 2:
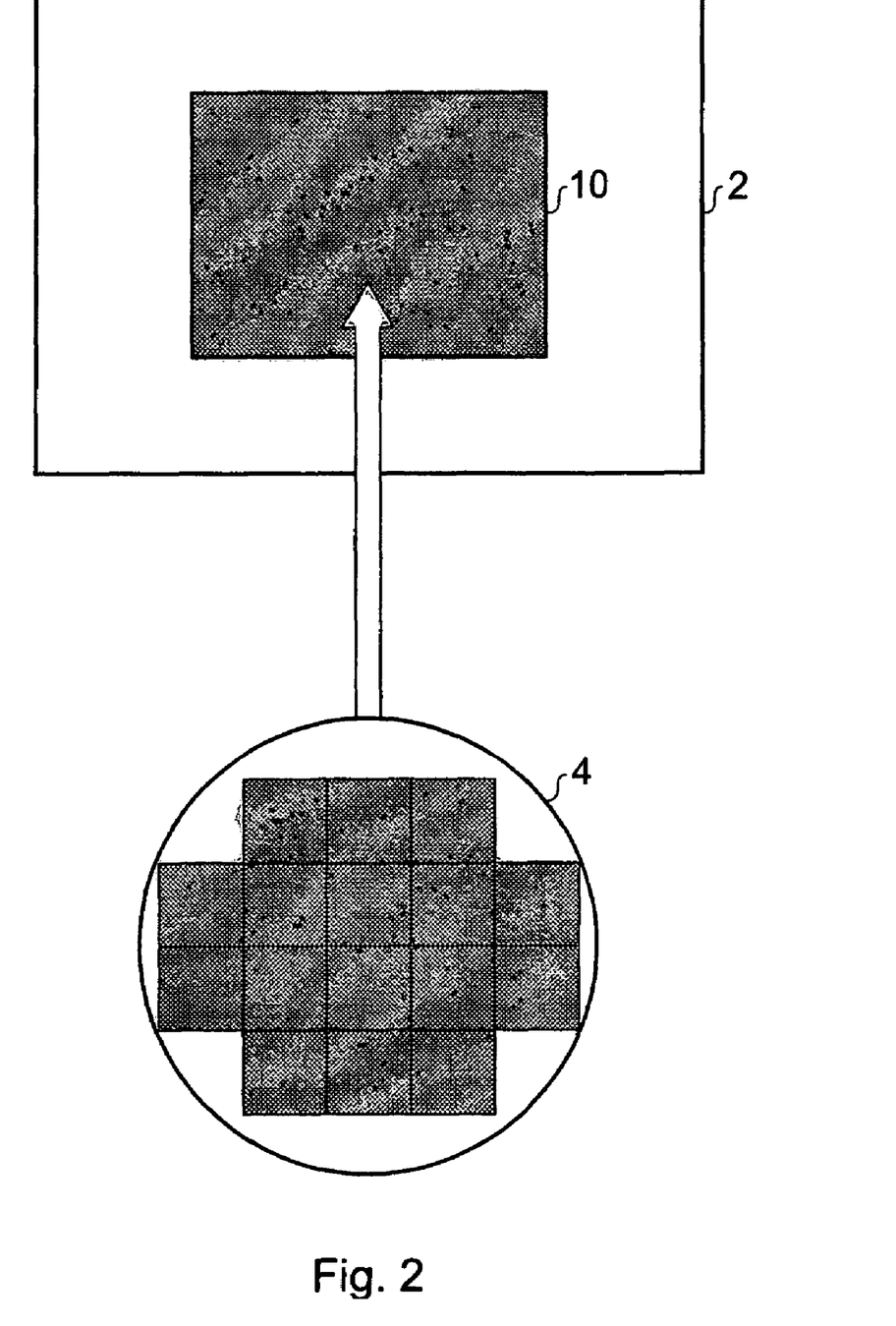
FIG. 2 is a schematic illustration of sampling by the sensor of FIG. 1 at full sensor resolution over half the dimension of the sensor.

FIGS. 1 and 2 are illustrations of a simple example of performing a 2× digital zoom using a sensor of fixed resolution. In FIG. 1 the full area of the sensor 2 is sampled at only half the pixel sites in both the horizontal and vertical directions to provide an image with no magnification at the desired output resolution. The circled area 4 in FIG. 1 represents a portion of the sensor 2 in greater detail. Each pixel 6 is illustrated, with the sampled pixels 8 being shown shaded. In FIG. 2, only the central portion 10 of the sensor 2 is sampled at the full sensor resolution, as shown by the enlarged region 4, thus providing an output that has the same pixel resolution as that for FIG. 1, while providing a 2× magnification of the received image.

Figure 3:
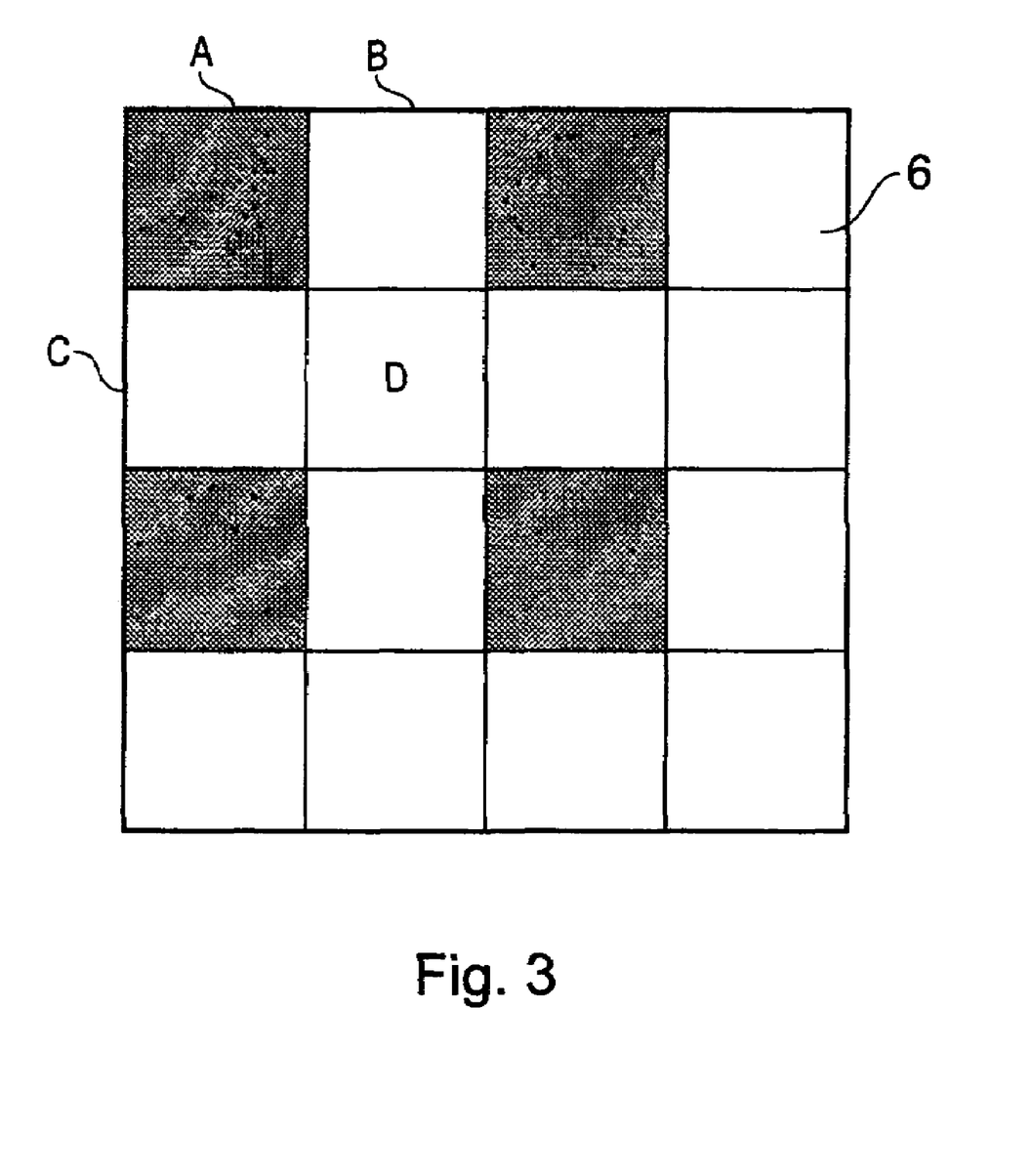
FIG. 3 is a schematic illustration of pixel binning.

To avoid sampling artefacts that are introduced by only sampling a proportion of the pixels 6 as is the case in FIG. 1, it is common practice to perform some form of charge binning prior to sampling. This is illustrated in FIG. 3. A 4×4 array of pixels 6 is illustrated, which in practice is a small portion of the total area of a sensor. The individual charge for each group of four pixels is combined into a single one of the four pixels prior to sampling. For example, the charges from each of pixels in the top left hand quadrant of the array shown in FIG. 3, labelled A to D, are combined, generally by the sensor reading electronics, to generate a single charge reading that is treated as a single pixel. This is illustrated schematically in FIG. 3 wherein, in effect, only every other pixel is sampled, although the charge value of that pixel is a weighted average of that pixel plus the three neighbouring pixels. It will be appreciated that the charge from the neighbouring pixels B-D is not physically transferred to the single pixel A.

Figure 4:
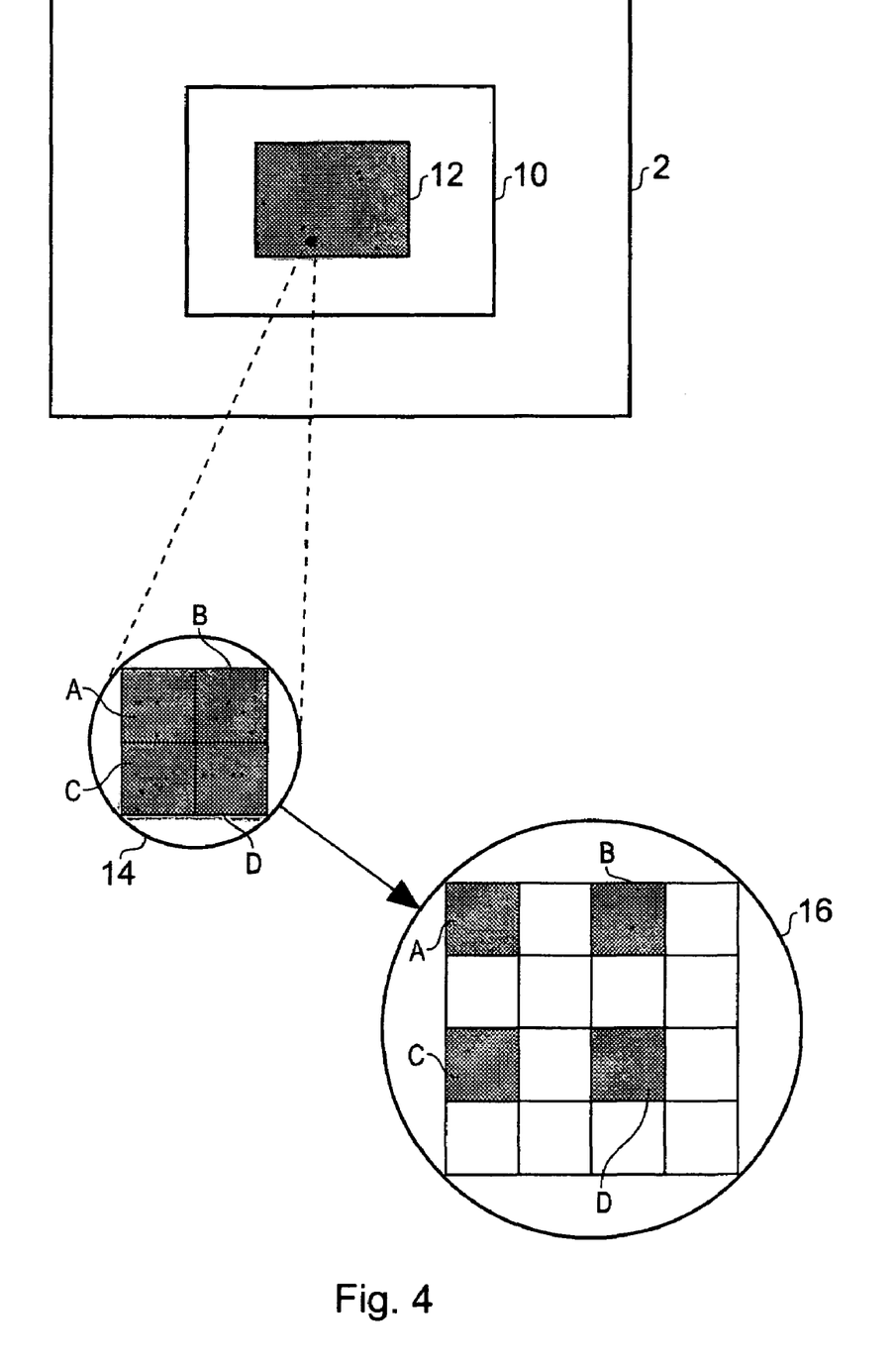
FIG. 4 is a schematic illustration of an interpolation-process.

To provide image digital magnification greater than that provided by sampling the sensor at full sensor resolution, it is necessary to use some form of interpolation. An example of this is illustrated in FIG. 4. In FIG. 4 the sensor is sampled at its full native resolution over an area 10 that is equivalent to the desired output resolution, for example 640×480 pixels. From area 10, a further area 12 is cropped that is half the size of the sampled area 10. The area 12 that is cropped represents the part of the sampled image that is to be magnified by a factor of 2. A small portion of the cropped area 12 comprising a block of four pixels is shown in the smaller of the circled regions 14. The individual pixels are labelled A to D, reading from the top left to the bottom right. For each pixel an interpolation process is applied in order to provide a final image having the desired output resolution, i.e. 640×480 pixels. The interpolation process is illustrated in the larger of the circled regions 16. In this particular case, the original pixels A to D are illustrated as shaded squares, with the remaining blank pixels being the pixels generated by the interpolation process. The final image is therefore at the desired resolution and provides a further magnification of 2× over an image produced by sampling the full area 10 at the native resolution of the sensor. As the process of interpolation generates pixel data rather than directly sensing it, there is an inevitable loss in image quality. Although the example shown in FIG. 4 only presents the case of a discrete digital zoom level (in this case ×2 for ease of understanding) it will be appreciated the interpolation process can be used to provide any continuous zoom level.

Figure 5:
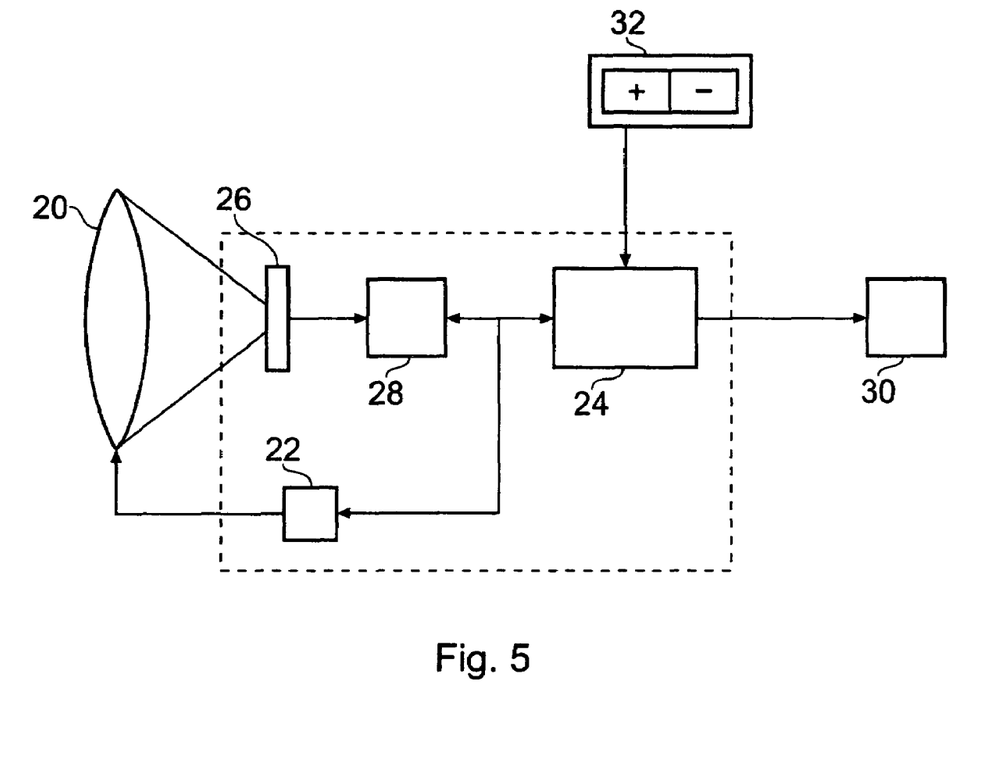
FIG. 5 is an illustration of an image acquisition system according to an embodiment of the present invention.

According to embodiments of the present invention, an image capture device provides combined optical and digital zoom facilities to attain an overall zoom factor that is the product of the individual optical and digital zoom factors whilst substantially reducing the use of pixel interpolation and the associated loss of quality. One such embodiment is schematically illustrated in FIG. 5. An optical zoom lens 20 is provided, the mechanical operation of which is accomplished using a zoom motor 22, for example of the ultrasonic type, under the control of a data processor 24. The optical image focussed by the lens 20 is received by an image sensor 26, typically a charge coupled device (CCD) sensor or more preferably a complementary metal on silicon (CMOS) sensor. The output from the sensor 26 is supplied to a digital zoom controller 28 that comprises, for example, a digital signal processor (DSP) of a known kind, that is arranged to perform both charge binning and interpolation functions. The output from the digital zoom controller 28 is input to the data processor 24 that in turn supplies an output signal, either analogue or digital, to an imaging device 30, such as a monitor, camera viewfinder, printer or other suitable apparatus. Manual zoom control 32, typically provided as part of the image capture device (for example a digital video camera), provides a zoom command signal to the data processor 24. The functions of the data processor 24 and the digital zoom controller 28 can be performed by a single processor.

Figure 6:
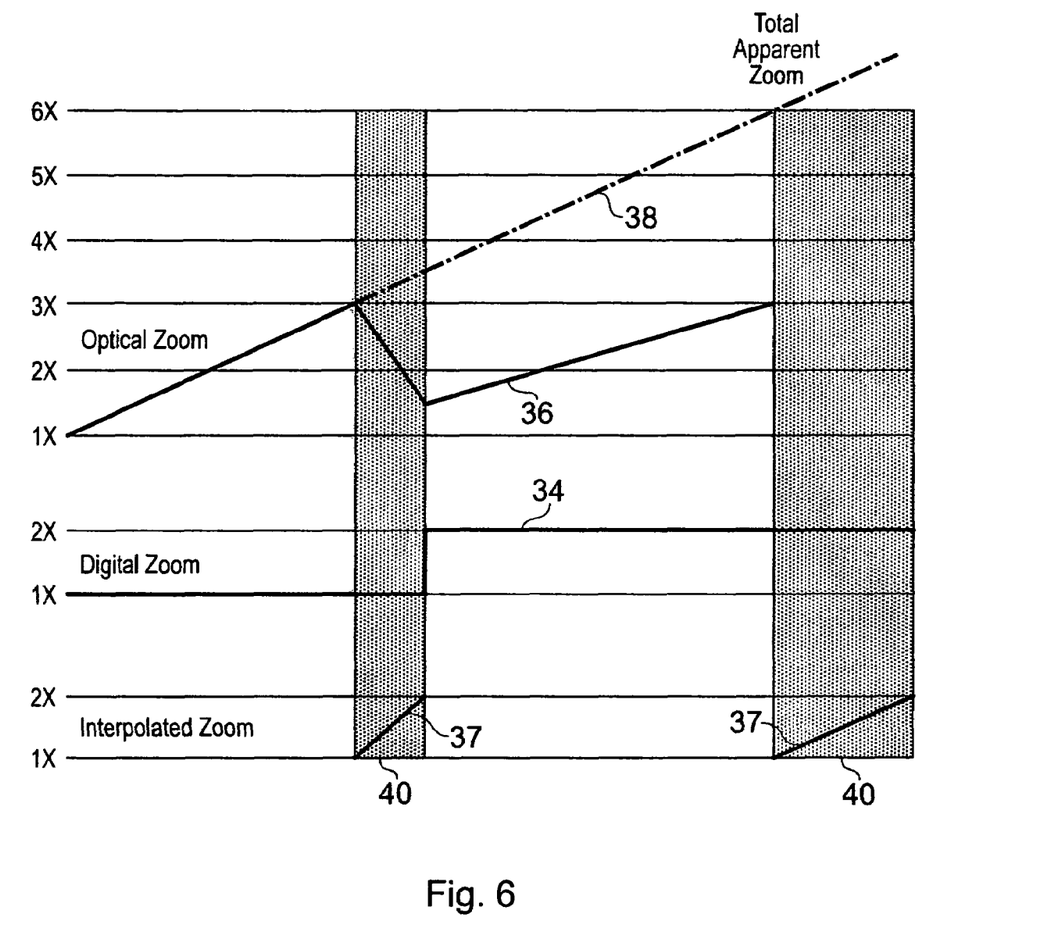
FIG. 6 is a diagrammatic illustration of a zooming strategy employed by the apparatus shown in FIG. 4.

The operation of the apparatus shown in FIG. 5 is best described with reference to FIG. 6. FIG. 6 is a graphic illustration of the possible available discrete digital zoom factors 34, the available optical zoom factors 36 and the available zoom factor due to interpolation 37. In the shown example only a single discrete digital zoom factor of 2× is provided. It is to be appreciated that multiple digital zoom factors are more commonly provided. The optical zoom 36 is continuously variable between a magnification of 1× and 3×. The total apparent zoom factor provided by the combination of digital and optical zoom factors is illustrated by the superimposed broken line 38 and therefore provides a total apparent zoom range between a factor of 133 and 6×.

To provide a zoom factor between 1× and 3× the digital zoom control 28 is commanded by the data processor 24 to provide a digital zoom level of 1×. This requires either a discrete level of binning to occur or to simply provide an output by sampling every pixel of the sensor 26 over only the desired area. Of course it will be appreciated that certain total zoom levels can be achieved by more than one combination of digital and optical zoom. For example a magnification of 1× digital zoom plus 3× optical zoom is equivalent to 2× digital zoom plus 1.5× optical zoom. The entirety of the zoom function is provided by the optical lens 20 as powered by the zoom motor 22 under the control of the data processor 24. The data processor 24 controls the motor 22 in accordance with zoom commands received from the zoom buttons 32.

In response to the maximum zoom factor provided by the optical lens 20 being reached and a further magnification command being received from the zoom buttons 32, transition period 40 (indicated by the shaded regions on the drawing) occurs. The data processor 24 commands the zoom motor 22 to reduce the provided optical zoom factor, as illustrated by the downward slope of line 36 in FIG. 6. At the same time the data processor 24 commands the digital zoom controller 28 to perform an interpolation process 37, to digitally increase the zoom factor. The zoom factor provided by interpolation process 37 compensates for reducing the optical zoom factor 36 such that the total apparent zoom factor increases, as demanded.

At the end of the transition period 40, the length of which is governed by the time taken to 'back off' the optical zoom lens 20, the digital zoom processor 28 is commanded by the data processor 24 to provide the next available discrete level of binning, which in the example shown in FIG. 6 provides a digital magnification of 2×, and then to cease the interpolation process. At this point the zoom lens 20 provides a level of magnification that in combination with the digital magnification is equivalent to the magnification previously provided by the interpolation process combined with the prior digital magnification immediately prior to the interpolation process being ceased. Further magnification is subsequently achieved using only the optical zoom lens 20. Consequently, during any given transition period three actions are performed; the optical zoom is 'reset', compensatory interpolation occurs and the discrete digital zoom level is changed.

Figure 7:
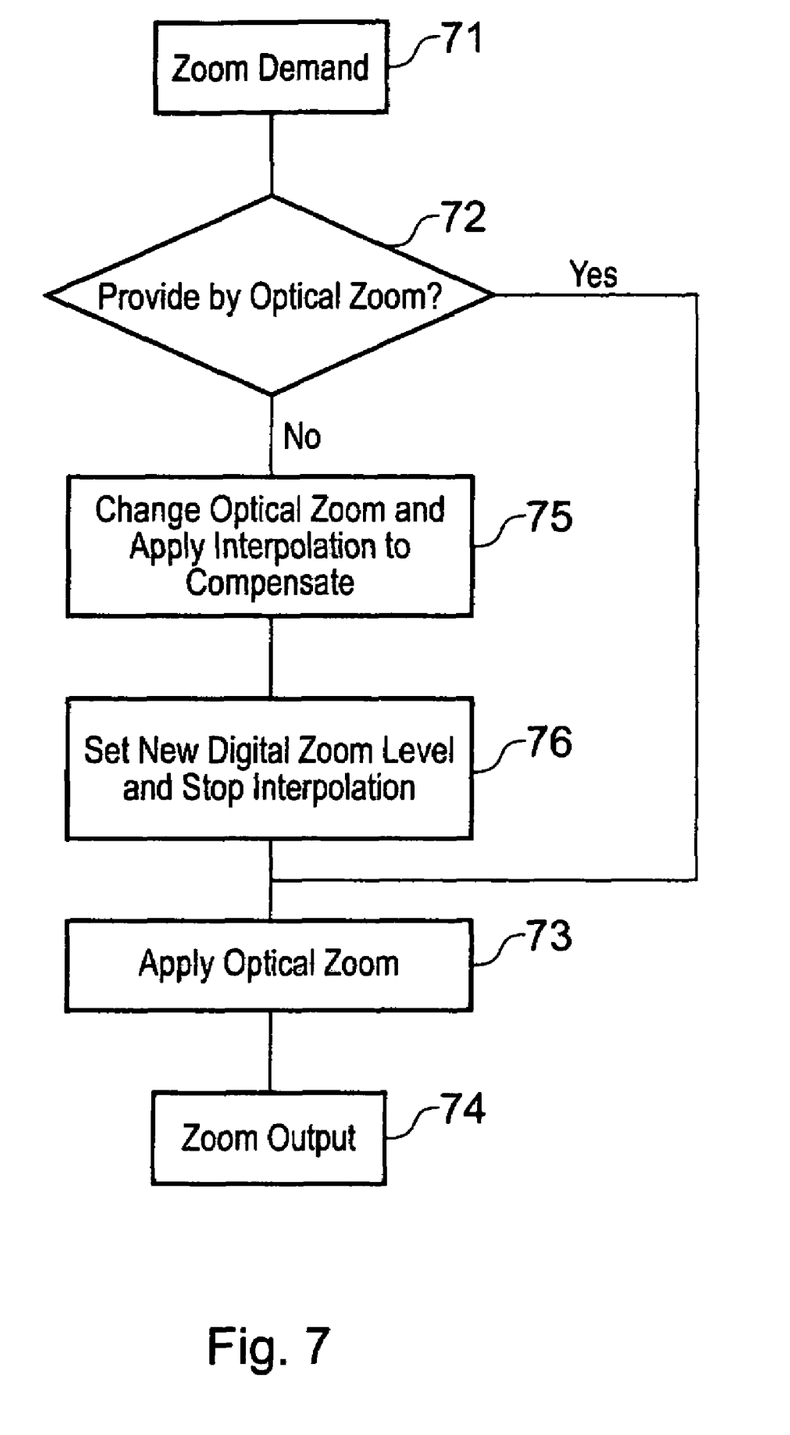
FIG. 7 is a flow chart of the method of an embodiment of the present invention.

The above process is also schematically illustrated in FIG. 7. The zoom command, as received from the zoom buttons 32, is shown as an input step 71. Then, during step 72, the data processor 24 determines whether or not the demanded zoom can be provided by the optical zoom lens alone. If, during step 73, processor 24 then determines the optical zoom lens can provide the demanded zoom, processing proceeds to step 74. During step 74 processor 24 controls the lens zoom. If, during step 73 data processor 24 determines that the demanded level of zoom cannot be provided by the optical zoom lens, then the level of optical zoom is changed simultaneously with digital interpolation being applied to compensate for the change in optical zoom, as represented at step 75 in FIG. 7. Subsequently, during step 76, processor 24 sets the discrete digital zoom level to a new value such that the new digital zoom level and the revised optical zoom level are combined to produce the same overall zoom level as that provided by the interpolation at step 75. The application of the optical zoom lens is then resumed at step 73.

Although the above description, with reference to FIG. 6, deals only with the case of zooming in i.e. increasing magnification, an analogous process is performed in the case of zooming out.

The period of interpolation that occurs prior to each step wise change of digital zooming level is necessary because in practice it is not possible to change the optical zoom lens settings instantaneously. Consequently, interpolation is only required over relatively small portions of the zoom range. As interpolation only occurs during the zooming process itself, the reduced image quality caused by the interpolation is masked. Furthermore, because the interpolation is only transient, if sufficient buffer memory, e.g. in processor 24, is available to the digital zoom controller 28, the processing load is spread in comparison with prior art systems that perform continuous interpolation.

If the demanded zoom level is set at a point at which interpolation ordinarily occurs, the data processor 24 can be arranged to detect this, for example by virtue of the lack of an input from the zoom control button 32, and to command the digital zoom processor 28 to cease the interpolation and switch to the next discrete binning level as soon as the optical zoom has reached a point that the combined magnification matches the magnification being demanded.

It will also be appreciated that the transition points do not necessarily have to be at the extremes of the optical zoom range and in fact can occur at any point depending on the particular zooming strategy implemented.

The present invention therefore provides an image capture apparatus for and method of operating the apparatus that allows apparent continuous zooming to be performed over the entire zoom range provided by the product of the optical and digital zoom functions with a minimum amount of pixel interpolation occurring.

The invention claimed is:

1. Zoom apparatus for digital image processing comprising:
   an optical zoom lens arranged to provide an image across a continuous zoom range;
   an image sensor arranged to receive an image from the optical zoom lens and to provide a digital representation of the image; and
   digital zoom apparatus arranged to apply (a) one of at least two discrete zoom levels to the digital representation of the image such that the total apparent zoom level is the product of the discrete digital zoom level and the optical zoom level, and (b) digital interpolation to the digital representation of the image during a transition period between discrete zoom levels, the transition period between discrete zoom levels being arranged to be initiated only at the end points of the optical zoom lens zoom range.

2. Zoom apparatus according to claim 1, wherein during the transition period between discrete zoom levels the optical zoom lens is arranged to be adjusted to substantially compensate for the change in discrete digital zoom level.

3. Zoom apparatus according to claim 2, wherein the optical zoom lens is arranged to be automatically adjusted to a point in the optical zoom lens zoom range that provides, as a product of zoom level with the changed digital zoom level, a total apparent zoom level substantially equal to the zoom level provided by the digital interpolation.

4. Zoom apparatus according to claim 1, wherein the digital zoom apparatus is arranged to apply the digital interpolation such that the rate of change of total apparent zoom level is substantially equal to the rate of change of zoom level provided by the optical zoom lens.

5. Zoom apparatus according to claim 1, wherein the discrete digital zoom levels are arranged to be provided by applying discrete charge binning schemes.

6. A digital camera in combination with the zoom apparatus according to claim 1.

7. Zoom apparatus for digital image processing comprising:
   an optical zoom lens arranged to provide an image across a continuous zoom range;
   an image sensor arranged to receive an image from the optical zoom lens and to provide a digital representation of the image; and
   digital zoom apparatus arranged to apply (a) one of at least two discrete zoom levels to the digital representation of the image such that the total apparent zoom level is the product of the discrete digital zoom level and the optical zoom level, and (b) digital interpolation to the digital representation of the image during a transition period between discrete zoom levels, the digital zoom apparatus being arranged to apply the digital interpolation such that the rate of change of total apparent zoom level is substantially equal to the rate of change of zoom level provided by the optical zoom lens.

8. Zoom apparatus according to claim 7, wherein the zoom lens is arranged to be automatically adjusted from a first end of the zoom range of the zoom lens towards a second end of the zoom range during the transition period between discrete zoom levels.

9. Zoom apparatus according to claim 8, wherein the transition period between discrete zoom levels is arranged to be initiated only at the end points of the optical zoom lens zoom range.

10. Zoom apparatus according to claim 7, wherein the discrete digital zoom levels are arranged to be provided by applying discrete charge binning schemes.

11. A digital camera in combination with the zoom apparatus according to claim 7.

12. Zoom apparatus according to claim 7, wherein during the transition period between discrete zoom levels the optical zoom lens is arranged to be adjusted to substantially compensate for the change in discrete digital zoom level.

13. Zoom apparatus according to claim 12, wherein the optical zoom lens is arranged to be automatically adjusted to a point in the optical zoom lens zoom range that provides, as a product of zoom level with the changed digital zoom level, a total apparent zoom level substantially equal to the zoom level provided by the digital interpolation.

* * * * *